(12) United States Patent
Rabinovitch et al.

(10) Patent No.: US 12,353,809 B2
(45) Date of Patent: Jul. 8, 2025

(54) TRANSFORMATIONS FOR MULTICYCLE PATH PREDICTION OF CLOCK SIGNALS

(71) Applicant: Synopsys, Inc., Mountain View, CA (US)

(72) Inventors: Alexander Rabinovitch, Shrewsbury, MA (US); Baijayanta Ray, Bangalore (IN)

(73) Assignee: Synopsys, Inc., Sunnyvale, CA (US)

(*) Notice: Subject to any disclaimer, the term of this patent is extended or adjusted under 35 U.S.C. 154(b) by 658 days.

(21) Appl. No.: 17/826,055

(22) Filed: May 26, 2022

(65) Prior Publication Data

US 2023/0195982 A1  Jun. 22, 2023

Related U.S. Application Data

(60) Provisional application No. 63/292,299, filed on Dec. 21, 2021.

(51) Int. Cl.
| | | |
|---|---|---|
| *G06F 30/33* | (2020.01) | |
| *G06F 9/455* | (2018.01) | |
| *G06F 30/331* | (2020.01) | |
| *G06F 30/367* | (2020.01) | |
| *G06F 30/398* | (2020.01) | |

(52) U.S. Cl.
CPC ............ *G06F 30/33* (2020.01); *G06F 9/455* (2013.01); *G06F 30/331* (2020.01); *G06F 30/367* (2020.01); *G06F 30/398* (2020.01)

(58) Field of Classification Search
CPC ...... G06F 30/33; G06F 30/331; G06F 30/367; G06F 30/398; G06F 9/455

USPC ...... 716/108, 113, 134, 136; 703/16, 17, 19, 703/28

See application file for complete search history.

(56) References Cited

U.S. PATENT DOCUMENTS

| | | | | |
|---|---|---|---|---|
| 5,901,061 A | * | 5/1999 | Gaddis | G06F 11/261 703/19 |
| 5,960,188 A | * | 9/1999 | Linke | G06F 30/33 703/15 |
| 7,937,259 B1 | * | 5/2011 | Chan | G06F 30/331 703/28 |
| 8,595,683 B1 | * | 11/2013 | de Buren | G06F 30/34 326/38 |
| 8,682,632 B1 | * | 3/2014 | Bowlby | G06F 30/33 703/13 |
| 9,846,571 B1 | * | 12/2017 | Venkataramani | G06F 8/35 |
| 10,860,761 B1 | * | 12/2020 | Vanukuri | G06F 30/396 |

(Continued)

FOREIGN PATENT DOCUMENTS

| | | | | |
|---|---|---|---|---|
| JP | 3592639 B2 | * | 11/2004 | ......... G06F 17/5027 |
| WO | WO-0124066 A1 | * | 4/2001 | ......... G06F 17/5027 |
| WO | WO-2013148409 A1 | * | 10/2013 | ........... G06F 30/331 |

*Primary Examiner* — Phallaka Kik
(74) *Attorney, Agent, or Firm* — Patterson + Sheridan, LLP

(57) ABSTRACT

Emulating a circuit design includes remodeling the clock signals of the circuit design. A circuit design includes clock signals that are based on a root clock signal. The clock signals are analyzed to identify a first clock signal of the clock signals that is faster than a second clock signal of the clock signals. The second clock signal is remodeled based on the first clock signal. An updated circuit design is generated based on remodeled second clock signal, and operation of the updated circuit design is emulated.

20 Claims, 9 Drawing Sheets

(56) References Cited

U.S. PATENT DOCUMENTS

| | | | | |
|---|---|---|---|---|
| 2003/0033588 A1* | 2/2003 | Alexander | G06F 9/54 | 717/163 |
| 2003/0046671 A1* | 3/2003 | Bowen | G06F 30/30 | 717/141 |
| 2003/0074642 A1* | 4/2003 | Haritsa | G06F 30/33 | 716/114 |
| 2003/0074643 A1* | 4/2003 | Schmitt | G06F 30/33 | 716/114 |
| 2003/0105620 A1* | 6/2003 | Bowen | G06F 30/33 | 703/22 |
| 2003/0212989 A1* | 11/2003 | Rokosz | G06F 11/3672 | 714/E11.219 |
| 2007/0129924 A1* | 6/2007 | Verheyen | G06F 30/33 | 703/14 |
| 2008/0077380 A1* | 3/2008 | Tamaki | G06F 30/367 | 703/15 |
| 2008/0109777 A1* | 5/2008 | Morishita | G06F 30/3312 | 716/108 |
| 2009/0033398 A1* | 2/2009 | Dennis | G06F 30/39 | 716/113 |
| 2009/0144690 A1* | 6/2009 | Spackman | G06F 30/30 | 716/104 |
| 2010/0185908 A1* | 7/2010 | Guo | G01R 31/318594 | 714/E11.155 |
| 2011/0307233 A1* | 12/2011 | Tseng | G06F 30/347 | 703/21 |
| 2012/0047412 A1* | 2/2012 | Chung | G01R 31/318552 | 714/E11.155 |
| 2013/0262073 A1* | 10/2013 | Asaad | G06F 9/455 | 703/14 |
| 2021/0232742 A1* | 7/2021 | Korchemny | G06F 30/3312 | |
| 2022/0113757 A1* | 4/2022 | Yan | G06F 1/3243 | |
| 2023/0342530 A1* | 10/2023 | Mori | H10D 84/01 | |
| 2023/0418748 A1* | 12/2023 | Basehore | G06F 13/1642 | |

* cited by examiner

TRANSFORMATIONS FOR MULTICYCLE PATH PREDICTION OF CLOCK SIGNALS

RELATED APPLICATION

This application claims the benefit of U.S. provisional patent application Ser. No. 63/292,299, filed Dec. 21, 2021, which is hereby incorporated herein by reference.

TECHNICAL FIELD

The present disclosure relates to clock signal prediction for circuit design emulation and prototyping processes.

BACKGROUND

Circuit designs are emulated, i.e., prototyped, to test the functionality of the circuit designs. Emulation is performed at the granularity of discrete clock cycles of a clock signal or signals. A circuit design typically includes multiple clock signals and data paths connecting circuit elements of the circuit design. The clock signals are based on a root clock signal (e.g., driver clock signal), and are slower than the root clock signal. During the emulation process, a data path is routed for multiple cycles of the root clock signal. However, the data path includes circuit elements that are not directly clocked (driven) by the root clock signal, but by a gated, or derived, version of the root clock signal. Conventionally, to ensure that such gated clock signals do not cause a hold time violation in the emulation process, the value of, or the change in, the gated clock signal is predicted for a cycle of the root clock signal. The predicted value is used as a clock enable signal for the circuit elements of the data path.

The predicted clock signal is driven by the root clock signal, which is faster than the gated clock signal. The gated clock signal drives the circuit elements of the data path, which use multicycle properties of the gated version of the slower clock signal. The multicycle properties correspond to a cycle (or period) of the gated clock signal, which occur during multiple cycles of the faster root clock signal. In one example, rising edges (e.g., positive edges) and falling edges (e.g., negative edges) of the slower gated clock signal occur at rising edges of the faster clock signal. During the emulation process, predicted enable logic is not able to take advantage of the slower gated clock signal as the predicted enable logic is triggered by the root clock signal. Accordingly, after the prediction process, the data path is an emulation and prototyping performance bottleneck.

SUMMARY

In one example, a method includes obtaining a circuit design that includes clock signals. Each of the clock signals is based on a root clock signal. The method further includes determining a first clock signal of the clock signals that is faster than a second clock signal of the clock signals, and remodeling the second clock signal based on the first clock signal. Further, the method includes generating an updated circuit design based on remodeled second clock signal, and operation of the updated circuit design is emulated.

In one example, a system includes a memory storing instructions and a processor that is coupled with the memory and a processor coupled with the memory and configured to execute the instructions, the instructions when executed cause the processor to obtain a circuit design that includes clock signals. Each of the clock signals is based on a root clock signal. The processor is further caused to determine a first clock signal of the clock signals that is faster than a second clock signal of the clock signals, and align each rising edge and each falling edge of the second clock signal with a respective rising edge of the first clock signal to generate a remodeled second clock signal. Further, the processor is caused to emulate the circuit design using the remodeled second clock signal.

In one example, a non-transitory computer readable medium includes stored instructions, which when executed by a processor, cause the processor to obtain a circuit design includes clock signals. Each of the clock signals is based on a root clock signal. The processor is further caused to determine a first clock signal of the clock signals that is faster than a second clock signal of the clock signals, and remodel the second clock signal based on the first clock signal. Further, the processor is caused to generate an updated circuit design based on remodeled second clock signal. Operation of the updated circuit design is emulated.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to transformations for multicycle path prediction of clock signals.

In the following, a method for performing prediction within an emulation, or prototyping, process of a circuit design is described. For example, prediction is performed such that the gated version of a slower clock signal (e.g., slower than the fastest clock signal of the circuit design), or any function of a group of slower clock signals can be predicted with a multicycle path function. The multicycle path function corresponds to the minimum of the multicycle path ratios provided by the slower clock signal or signals with respect to a faster clock signal (e.g., root clock signal or emulation clock signal). Accordingly, the multicycle properties are enabled on the predicted clock enable path, easing the timing closure for circuit designs with complex clock tree structures.

The improved prediction method described herein utilizes higher frequency (e.g., faster) clock signals, leading to faster emulation (i.e., prototyping) speeds, as compared to conventional prediction methods. Further, the following described prediction method provides lower compile times. Additionally, in instances when the propagation of a clock cone (e.g., a cone of logic) of a clock signal crosses a boundary of a field programmable gate array (FPGA) chip, or other integrated circuit (IC) chip, the ability to perform the propagation of the clock cone as a multicycle path improves the partitioning between the FPGA chips and the place and route solution. A clock cone corresponds to the circuit elements that receive one or more clock signals, and generates one or more gated, or derived, clock signals.

In one or more examples, compiler systems work at the granularity of a period of a single discrete clock signal often referred to as a root (or driver) clock signal. Compiler systems employ a prediction process that moves circuit elements (e.g., flipflop and/or latches, among others) of a circuit design from a derived clock signal (e.g., a gated clock signal) onto a common ancestor clock signal (e.g., the root clock signal) to resolve hold violations that may occur when emulating a circuit design. A common ancestor clock signal is a clock signal from which the clock signals that control the different circuit elements of the circuit design are generated.

Figure 1:
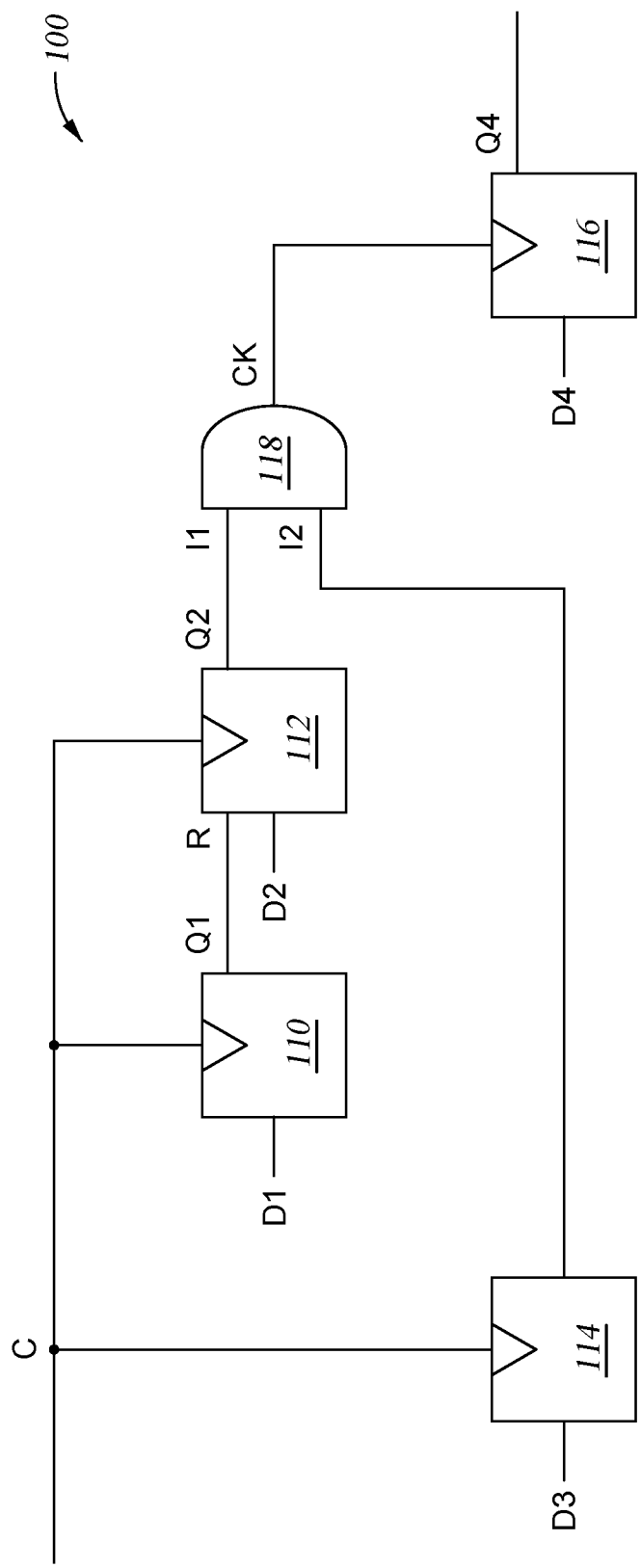
FIG. 1 illustrates an example circuit design, according to one or more examples.

FIG. 1 illustrates a circuit design 100, according to one or more examples. The circuit design 100 includes flipflops 110-116 and AND gate 118. The flipflops 110-114 receive the clock signal C. Stated another way, the flipflops 110-114 are driven by the clock signal C. Further, the flipflops 110-114 are on the same clock domain, e.g., the clock domain of the clock signal C. The clock signal C may be referred to as the "root clock" of the circuit design 100.

The input signal to the flipflop 110 is the data signal D1 and the output of the flipflop 110 is the output signal Q1. The flipflop 112 receives the data signal D2, and the reset signal R. The reset signal R is the output signal Q1 of the flipflop 110. The flipflop 112 outputs the output signal Q2. Based on the output signal Q1 having a value of one (and the reset signal having a value of one), the output signal Q2 has a value of zero. Based on the output signal Q1 having a value of zero, the output signal Q2 has a value of the data signal D2. Further, the flipflop 114 receives the data signal D3 and outputs the output signal Q3.

The AND gate 118 receives the input signals I1 and I2. The input signal I1 is the output signal Q2 of the flipflop 112 and the signal I2 is the output signal Q3 of the flipflop 114. The AND gate 118 outputs the clock signal CK based on the input signals I1 and I2.

The flipflop 116 receives the clock signal CK, and the data signal D4, and outputs the output signal Q4. The flipflop 116 is driven by the clock signal CK that is output by the AND gate 118.

When evaluating during emulation the circuit design 100, prediction is used to predict a future (next) value of the clock signal CK (e.g., the future output value of the AND gate 118). Performing prediction applies a divide and conquer approach to determine the future value of the clock signal CK (e.g., CK_Next). For example, the future value of the clock signal CK is based on the output signals Q2 and Q3 of the flipflops 112 and 114, which are driven by the clock signal C.

At a rising edge of the clock signal C, there is a delay in determining the value of the clock signal CK. For example, there is a delay in determining if the clock signal CK has a rising edge based on a rising edge of the clock signal C. The delay corresponds to the propagation time of rising edge (e.g., positive edge) of the clock signal C through the flipflops 110-114. At the completion of the propagation time, and when the flipflops 110-114 and the AND gate 118 settle, the clock signal CK is determined to either have a rising edge or not.

In one example, to determine the future value of the clock signal CK an auxiliary circuit is created such that at a rising edge of the clock signal C, the future value of CK can be determined. The future value of the clock signal CK is determined based on the future value of the input signal I1 (e.g., I1_Next) and future value of the input signal I2 (e.g., I2_Next). For example, the future value of the clock signal can be determined from the expression CK_next=&I1_next I2_next. The future value of the input signal I2 is ahead of a positive edge of the clock signal C. For example, at a rising edge of the clock signal C, the output signal Q3 of the flipflop 114 is the data signal D3. Accordingly, at a rising edge of the clock signal C, the input signal I2 is the data signal D3, and the future value of the input signal I2 is D3.

The future value of the input signal I1 is the future value of the output signal Q2 of the flipflop 112. The flipflop 112 is reset based on the reset signal R (e.g., the output signal Q1 of the flipflop 110). Accordingly, the future value of the output signal Q2 (e.g., Q2_next) is zero when the future value of the reset signal R (e.g., R_next) has a rising edge. Based on the future value of the reset signal R not having a rising edge, and the clock signal C having a rising edge, the output signal Q2 is the data signal D2. Accordingly, the input signal I1 is the data signal D2, and the future value of the input signal I1 is D2.

The future value of the reset signal R corresponds to the future value of the output signal Q1 of the flipflop 110. At a rising edge of the clock signal C, the output signal Q1 is the data signal D1. Accordingly, the future value of the output signal Q1 (e.g., Q1_next) at a rising edge of the clock signal C is D1.

As can be seen from the above description, the future value of the clock signal CK is based on a function of the values D1, D2, and D3.

The flipflop 116 outputs the output signal Q4. In one example, the output signal Q4 is a clock signal for another circuit element. Predicting the future value of the output signal Q4 (e.g., Q4_next) is based on the future (e.g., predicted) value of the clock signal CK. In one example, when the future value of the clock signal CK is a rising edge, the output signal Q4 is the data signal D4 and has a value of D4.

In one or more examples, when predicting the value of a clock signal (e.g., the clock signal CK), the output value of each circuit element (primitive) of the corresponding clock cone is predicted. A clock cone for a clock signal includes each circuit element that is driven to generate the clock signal. For example, with reference to the clock signal CK of FIG. 1, the clock cone includes each circuit element driven by the clock signal C, and includes flipflops 110-114, and the AND gate 118. For each circuit element, a local formula (e.g., prediction expression) is used to determine a corresponding predicted output value. The prediction expressions for each element are chained together to determine the predicted value of the clock signal. For example, to determine a predicted (e.g., future) value of the clock signal CK, the predicted output value of each of the flipflops 110-114 and the AND gate 118 are determined based on a corresponding local formula.

In one or more examples, when performing the prediction process, a clock cone is determined to be a combinational circuit with the requirement to propagate within one period of the root clock signal (e.g., the clock signal C of FIG. 1). A clock cone has the requirement to propagate within one period of the root clock signal as the circuit elements within the clock cone generate output signals that are generated and consumed at rising edges of the root clock signal. For example with reference to FIG. 1, the flipflops 110-114 generate output signal Q1, Q2, and Q3 based on the clock signal C.

Prediction is completed with respect to the common root clock signal and the prediction expression for each circuit element. In one example, for a flipflop with reset, if the value at the reset input is one, then the output signal Q of the flipflop has a value of zero. If the value of the reset is zero, the output signal Q of the flipflop is value of the data signal D. Stated another way, a flipflop that receives clock signal CK, a reset signal R, and a data signal D, and outputs the output signal Q, is predicted based on Expression 1. In Expression 1, if the value of the reset signal R is going to rise (e.g., a rising edge), the output value of the flipflop is zero, otherwise, the output value of the flipflop is D.

always @(posedge CK or posedge R)

if (R)Q<=0; else Q<=d;

assign Q_next=(R_next)?0:((CK_next & ~CK)?D:Q)   Expression 1

Further, a latch that receives the clock signal CK and the data signal D, and outputs the output signal Q, is predicted based on Expression 2. For a latch, if the reset signal is going to rise (e.g., a rising edge), the predicted output value (Q_next) of the latch is zero, or if the next value of clock signal CK (e.g., CK_next) is going to rise (e.g., a rising edge), the output value of the latch is D_next. Otherwise, the output value of the output signal of the latch is Q.

always_latch if (R)Q<=0; else if (CK)Q<=D;

assign Q_next=(R_next)?0:((CK_next)?D_next:Q)   Expression 2

A generated clock signal can be predicted from a root clock signal (e.g., clock signal PCLK) based on Expression 3.

always @(posedge PCLK)C<=C_next   Expression 3

Each circuit element within a clock cone has a corresponding local formula that may be used to predict the future output of the circuit element. The local formula for a circuit element may be dependent on the predicted value of a previous circuit element and/or the predicted value of the circuit element may be used by another circuit element within the circuit design.

With reference to FIG. 1, and as is described above, the predicted value of the clock signal CK is CK_next. CK_next is determined based on the expression CK_next=I1_next& I2_next. The value of I2_next is D3 and the value of I1_next is determined from the expression I1_next=R_next? 0: D2. The value of R_next is D1. Accordingly, the value of Q4_next is determined from the expression Q4_next= (CK_next & ~CK)? D4: Q4. The expression ALWAYS @(POSEDGE C) IF (CK_Next & ~CK) Q4<=D4 can be substituted for the flipflops 110-114. Further, the value of the clock signal CK can be predicted from the expression ALWAYS @(posedge C) CK<=CK_next, where the original driver is removed.

While the example of FIG. 1 describes prediction with respect to a root clock signal (e.g., clock signal C) and a single clock signal (e.g., clock signal CK) generated from the root clock signal, in other examples, similar prediction processes are applied to circuit designs that include multiple clock signals that are generated from a common root signal. However, in such a prediction process, the propagation time is one period of the root clock signal (e.g., the clock signal C).

The following described prediction process performs prediction of one or more clock signals based on a slower clock signal generated from the root clock signal, leading to faster emulation (i.e., prototyping) speeds, as compared to conventional prediction processes. Further, the following described prediction method provides lower compile times due to ease of timing requirements. Additionally, in examples when the propagation of a clock cone crosses a boundary of a field programmable gate array (FPGA) chip, or other integrated circuit (IC) chip, the following described prediction process improves the partitioning between the FPGA chips and the corresponding place and route solution.

Figure 2:
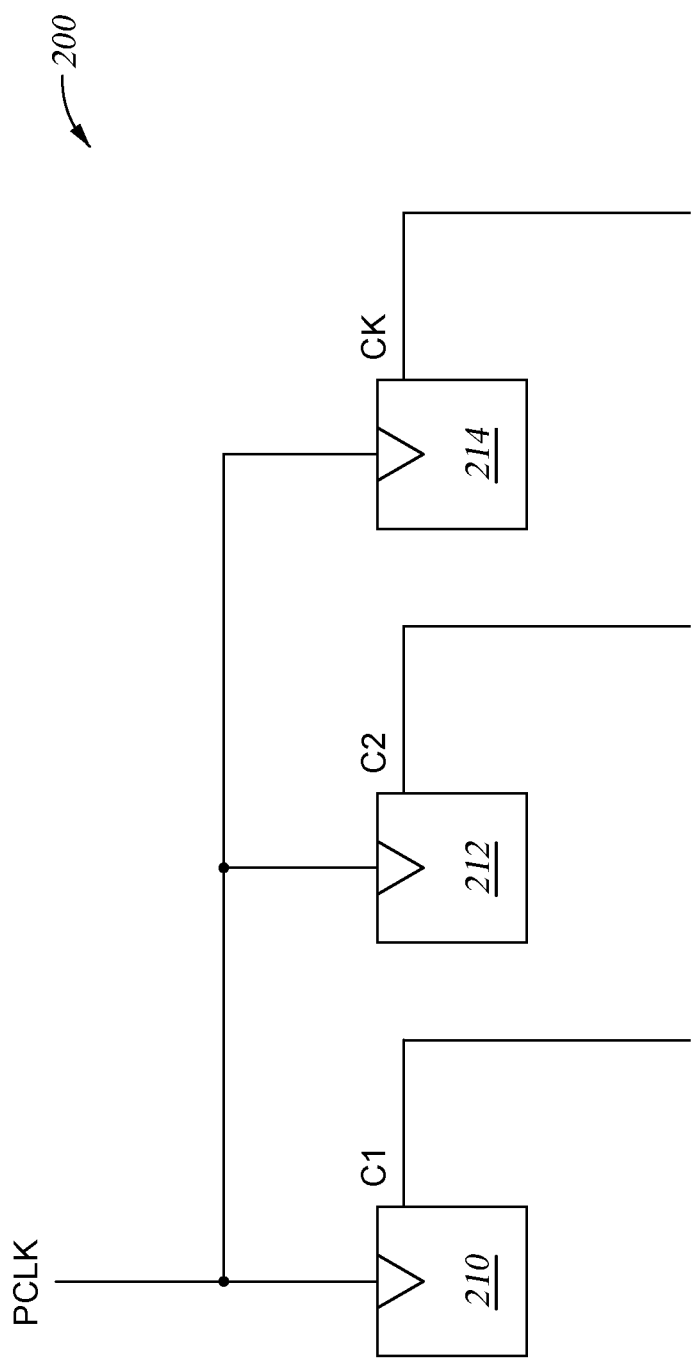
FIG. 2 illustrates an example circuit design, according to one or more examples.

As is noted above, in a typical prediction process a predicted clock cone is required to propagate within one period of the root clock signal. For example, with reference to FIG. 1, the predicted value of the clock signal CK (e.g., CK_next) is required to be determined within one period of the clock signal C. However, a circuit design may include multiple clock signals that operate at different rates that are slower than a root clock signal. Accordingly, predicting one of the clock signals based on another clock signal other than the root clock signal increases the required propagation time that is used to predict another one of the clock signals. For example, FIG. 2 illustrates a circuit design 200 that includes the clock signals PCLK, C1, C2, and CK. The clock signal PLCK is the root (driver) clock signal for the clock signals C1, C2, and CK. For example, the clock signal PCLK is the driver clock signal for the flipflops 210-214 that output the clock signals C1, C2, and CK, respectively, based on the clock signal PCLK.

As each of the clock signals C1, C2, and CK are generated based on the clock signal PCLK, the clock signal PCLK may be referred to as a common ancestor clock signal for the clock signals C1, C2, and CK. Accordingly, a typical prediction process that is based the clock signal PCLK will require that the clock signals C1, C2, and CK propagate within one period of the clock signal PCLK.

Figure 3:
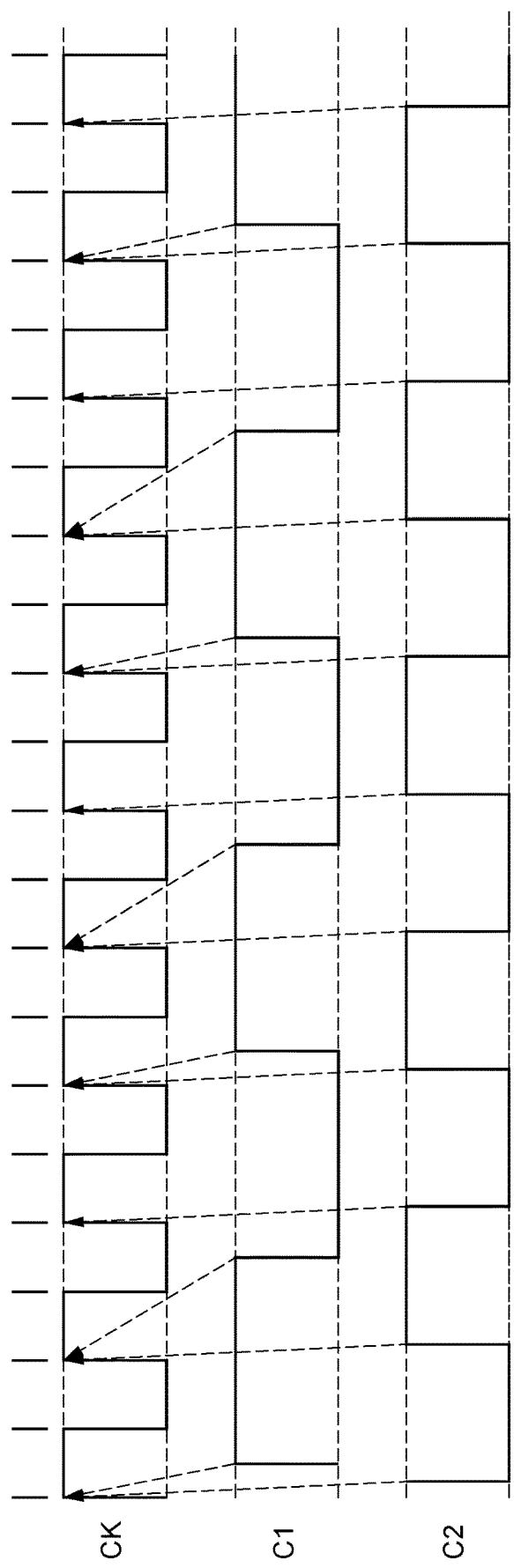
FIG. 3 illustrates the waveforms for the clock signals of the circuit design of FIG. 2, according to one or more examples.

FIG. 3 depicts the waveforms for the clock signals C1, C2, and CK. The clock signals CK, C1, and C2 are oscillating signals that transition between first and second voltages at rising edges (e.g., positive edges) and falling edges (e.g., negative edges). As can be seen from FIG. 3, the clock signal C1 and the clock signal C2 are slower than the clock signal CK. For example, the period of the clock signal CK is two, the period of the clock signal C2 is four, and the period of the clock signal C1 is six. Accordingly, the clock signal CK is at least twice as fast as the clock signals C1 and C2. In one example, the ratio between the periods of the clock signals C1, C2, and CK may be used to determine the fastest clock signal.

As the clock signal CK is at least twice as fast as the clock signals C1 and C2, the circuit design 200 can be remodeled such that the clock signals C1 and C2 are generated based on the clock signal CK instead of the clock signal PCLK. As the clock signal CK is slower than the clock signal PCLK, remodeling the circuit design 200 such that the clock signals C1 and C2 are generated based on the clock signal CK, allows for the clock trees associated with the clock signals C1 and C2 to be predicted over longer periods of time, improving the emulation and prediction process for the circuit elements of the corresponding clock trees.

In one or more examples, remodeling the circuit design 200 such that the clock signals C1 and C2 are generated based on the clock signal CK generates the remodeled circuit design 400. The clock signal CK is generated by the flipflop 214 from the clock signal PCLK as is described above with regard to FIG. 2. In the remodeled circuit design 400, the clock signals C1 and C2 are generated based on the clock signal CK, not the clock signal PCLK as is described with regard to the circuit design 200 of FIG. 2. The clock signal CK is the root clock signal for the clock signals C1 and C2 in the remodeled circuit design 400. The clock signals C1 and C2, and corresponding clock trees are predicted based on the clock signal CK in the remodeled circuit design 400. Accordingly, as compared to the circuit design 200 of FIG. 2, in the remodeled circuit design 400, the clock signals C1 and C2, and corresponding clock trees are propagated in a period of the clock signal CK instead of the clock signal PCLK. As the clock signal CK is slower than the clock signal PCLK, the period to propagate clock signals C1 and C2 and corresponding clock trees of the remodeled circuit design 400 is larger than the period to propagate the clock signals C1 and C2, and the corresponding clock trees of the circuit design 200. The period to propagate the clock signal C1 and C2, and corresponding clock trees of the remodeled circuit design 400 may be twice as large as the period propagate the clock signals C1 and C2, and the corresponding clock trees of the circuit design 200. In one specific example, the constraint for the clock signals C1 and C2, and corresponding clock trees in the circuit design 200 is 200 ns. However, in the remodeled circuit design 400, the constraint of the clock signals C1 and C2, and the corresponding clock trees is 400 ns.

In one example, as the clock trees associated with the clock signals C1 and C2 are based on the clock signal CK, a clock cone including the clock signals C1 and C2, and the associated clock trees is a data path having a constraint of a full period of the clock signal CK. As compared to the clock cone of the circuit design 200, portions of the clock cone including the clock signals C1 and C2 of the remodeled circuit design 400 has portions that operate at slower rates than other portions of the clock cone.

In one example, generating the remodeled circuit design 400 includes modeling the clock signals C1 and C2 based on the clock signal CK such that the rising and falling edges of the clock signals C1 and C2 are aligned with rising edges of the clock signal CK. For example, as illustrated in FIG. 3, the rising edges and the falling edges of the clock signal C1 are moved to be aligned with the nearest respective rising edge of the clock signal CK. Each rising edge and falling edge of the clock signal C1 is aligned with respective rising edge of the clock signal CK. Further, the rising edges and the falling edges of the clock signal C2 are moved to be aligned with the nearest respective rising edge of the clock signal CK. Each rising edge and falling edge of the clock signal C2 is aligned with respective rising edge of the clock signal CK. There are no rising or falling edges of the clock signal C1 and/or C2 aligned with a falling edge of the clock signal CK.

Figure 5:
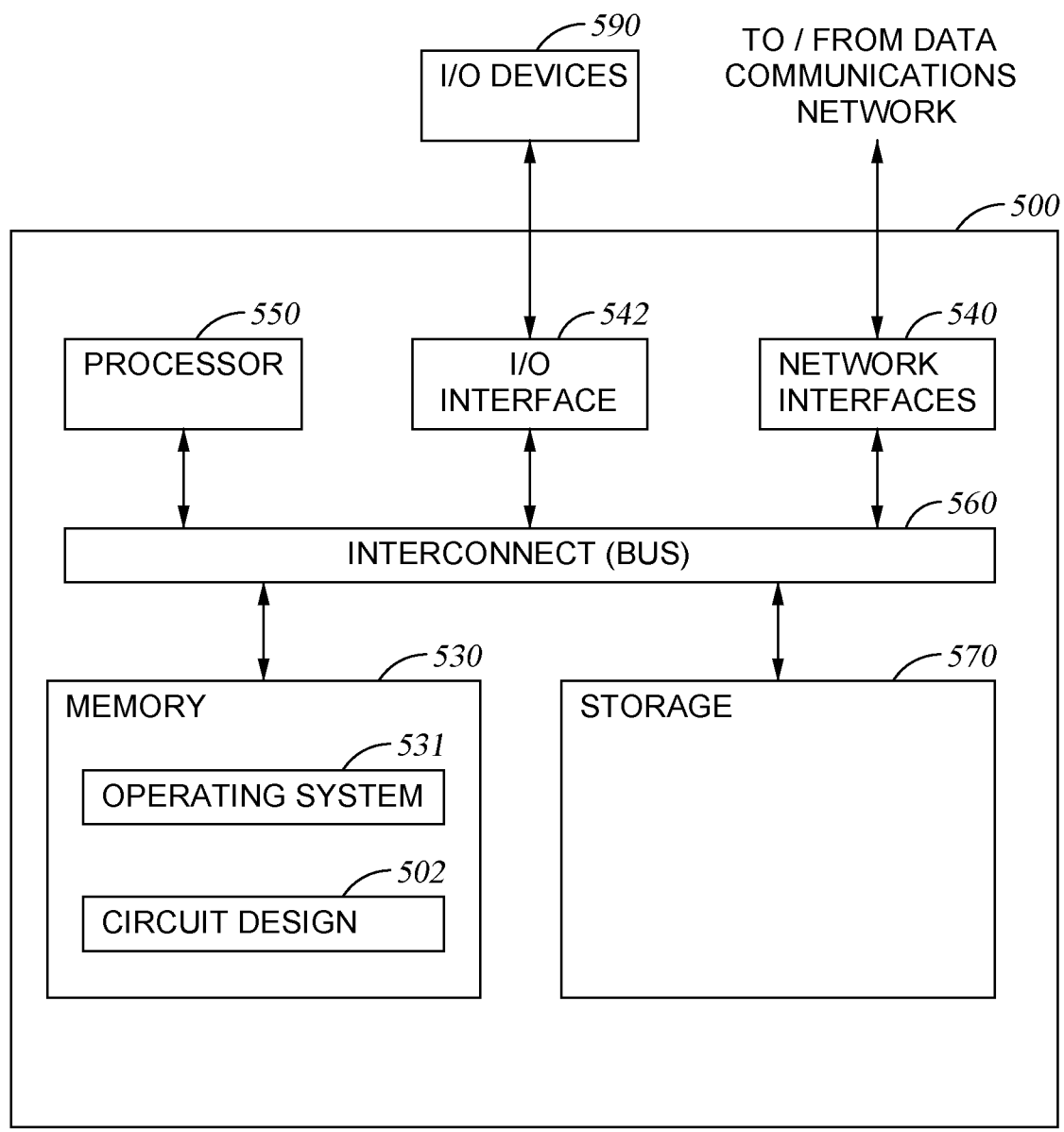
FIG. 5 is a block diagram of a compiler system, according to one or more examples.

FIG. 5 illustrates a compiler system 500 according to one or more examples. In one example, the compiler system 500 is configured similar to the compiler 810 of FIG. 8. As shown, the compiler system 500 includes, without limitation, a computer processor 550 (e.g., a central processing unit), a network interface 540, and memory 530. The compiler system 500 may also include an input/output (I/O) device interface 542 connecting I/O devices 590 (e.g., keyboard, display and mouse devices) to the compiler system 500.

Figure 9:
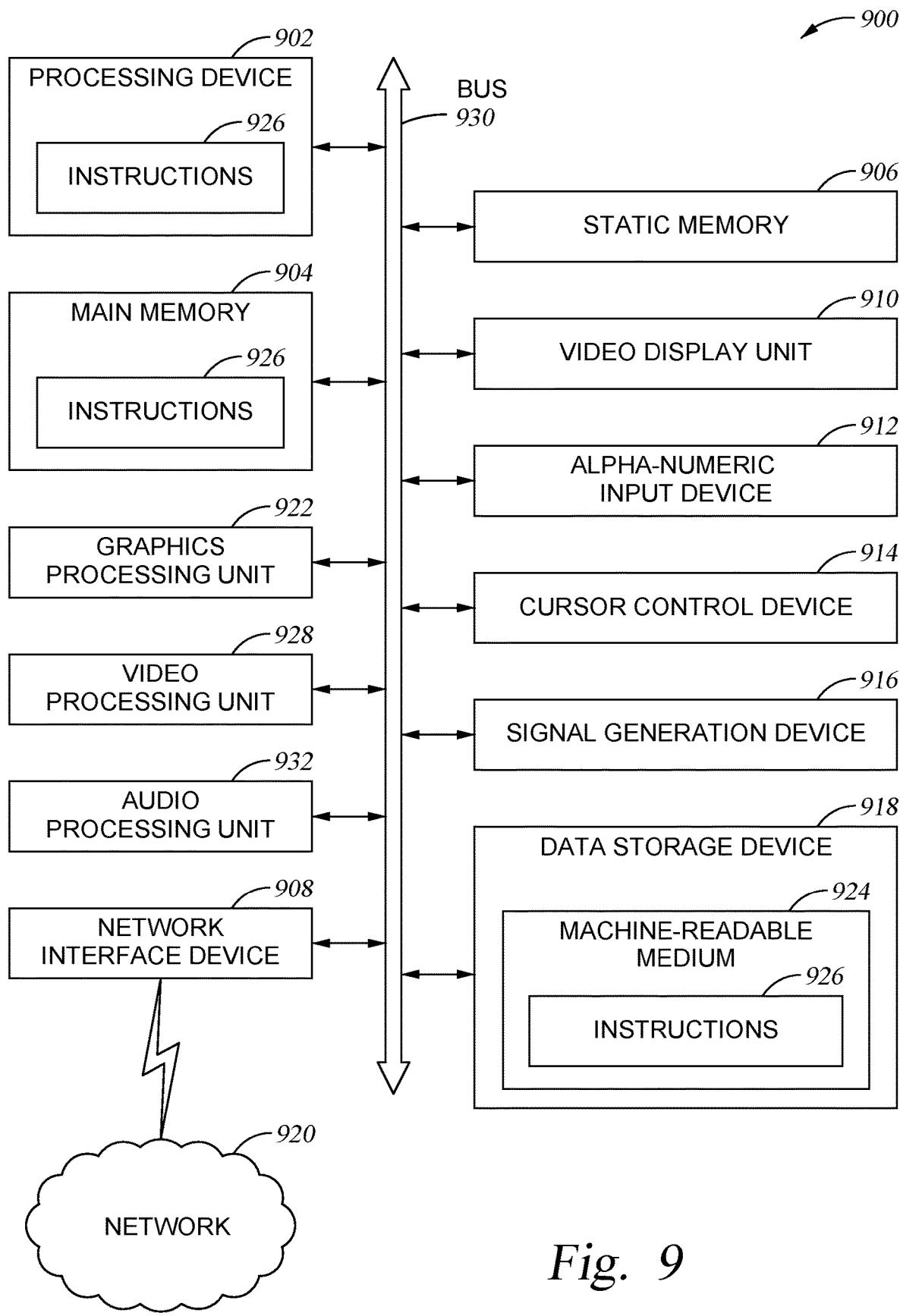
FIG. 9 depicts a diagram of an example computer system in which embodiments of the present disclosure may operate.

The computer processor 550 is configured similar to the processing device 902 of FIG. 9. In one or more examples, the computer processor 550 retrieves and executes programming instructions stored in the memory 530 (e.g., a non-transitory computer readable medium). Similarly, the computer processor 550 stores and retrieves application data residing in the memory 530. A bus 560 facilitates transmission, such as of programming instructions and application data, between the computer processor 550, I/O device interface 542, storage 570, network interface 540, and memory 530. The bus 560 is configured similar to the bus 930 of FIG. 9. The computer processor 550 is included to be representative of a single processor, multiple processors, a single processor having multiple processing cores, and the like. Further, the memory 530 and the storage 570 are generally included to be representative of volatile and non-volatile memory elements. For example, the memory 530 and the storage 570 can include random access memory and a disk drive storage device. Although shown as a single unit, the memory 530 or the storage 570 may be a combination of fixed and/or removable storage devices, such as magnetic disk drives, flash drives, removable memory cards or optical storage, network attached storage (NAS), or a storage area-network (SAN). The storage 570 may include both local storage devices and remote storage devices accessible via the network interface 540. In one example, the memory 530 and/or the storage 570 are configured similar to one or more of the main memory 904 of FIG. 9, the data storage device 918 of FIG. 9, or the machine-readable medium 924 of FIG. 9.

As shown, the memory 530 includes an operating system 531. The operating system 531 may facilitate receiving input from and providing output to various components. For example, the network interface 540 can be used to transmit and/or receive a circuit design. The network interface 540 is configured similar to the network interface device 908 of FIG. 9.

Figure 4:
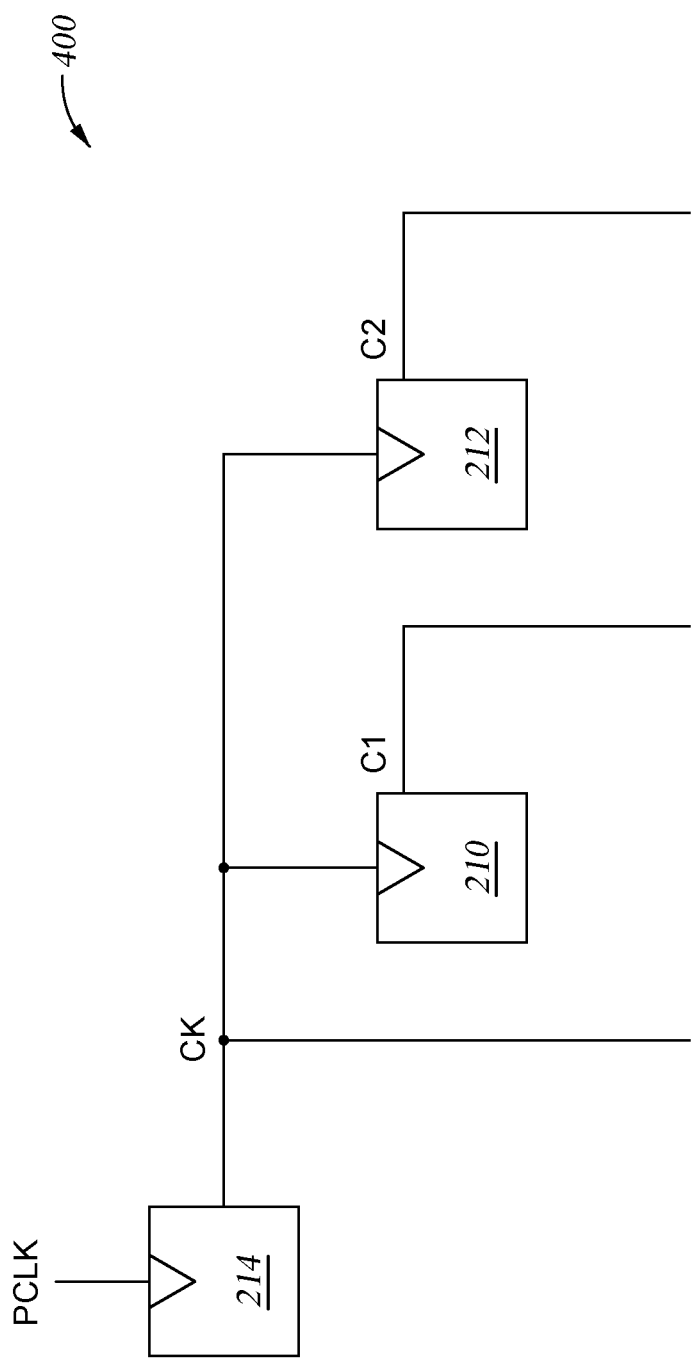
FIG. 4 illustrates a remodeled circuit design of the circuit design of FIG. 2, according to one or more examples.
Figure 6:
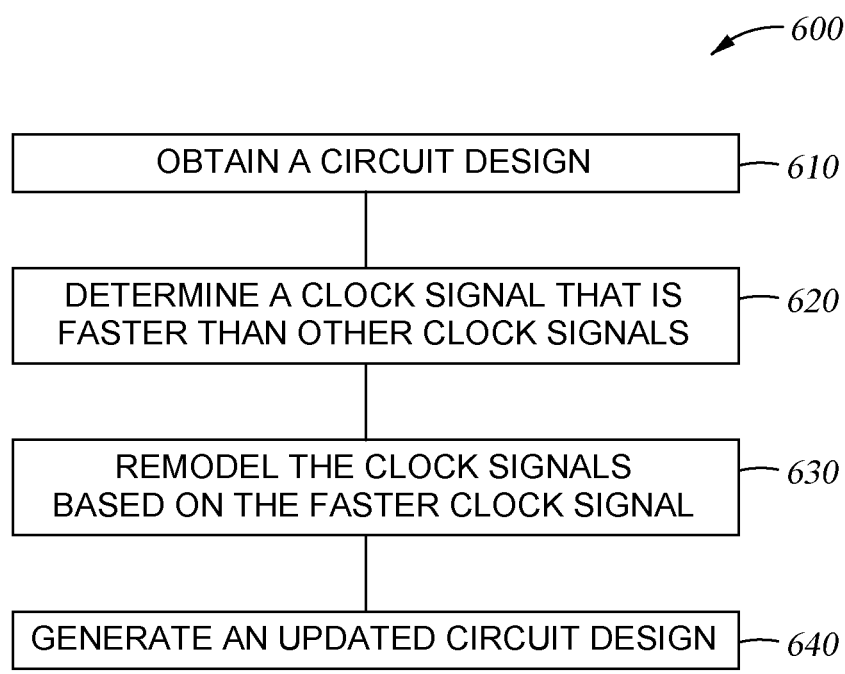
FIG. 6 illustrates a flowchart of a method for updating a circuit design, according to one or more examples.

FIG. 6 illustrates a flowchart of a method 600 for generating an updated circuit design, according to one or more examples. The method 600 is performed by the compiler system 500. For example, the compiler system 500 executes one or more instructions stored within the memory 530 to perform the method 600. The method 600 performs prediction and clock signal remodeling as described with regard to FIGS. 2, 3, and 4 above. In one example, the method 600 is performed as part of analysis and extraction 726 of FIG. 7.

At 610 of the method 600, a circuit design 502 is obtained by the compiler system 500. The circuit design 502 may be a digital design file that includes clock signal information. The compiler system 500 may obtain the circuit design 502 from the memory 530 or from another system connected to the compiler system 500. The circuit design 502 may be configured similar to that of the circuit design 200. For example, the circuit design 502 includes circuit elements (e.g., flipflops, gate logic, and latches, among others) driven by one or more clock signals. In one example, the circuit design 502 includes multiple different clock trees each associated with different clock signals. For example, the circuit design 502 may be configured similar to the circuit design 200 of FIG. 2. In the circuit design, the clock signals are driven based on a common root clock signal. For example, the circuit design 502 includes clock signals REF1, REF2, REF3, REF4, C1, C2, C3, and C4. In other examples, the circuit design 502 may include more than or less than eight clock signals. The clock signals REF1, REF2, REF3, REF4, C1, C2, C3, and C4 are driven based on a common root clock signal (e.g., clock signal PCLK of FIG. 2).

At 620 of the method 600, the compiler system 500 determines that one or more of the clock signals REF1, REF2, REF3, REF4, C1, C2, C3, and C4 is at least two times faster than another one or more of the clock signals REF1, REF2, REF3, REF4, C1, C2, C3, and C4. In one example, the compiler system 500 determines that the clock signal REF1 is at least two times faster than the other clock signals. In one example, the compiler system 500 compares the frequency of the clock signals REF1, REF2, REF3, REF4, C1, C2, C3, and C4 to each other to determine the fastest clock signal. In another example, the compiler system 500 determines that the clock signal REF1, REF2, REF3, and REF4 are at least two times faster than one or more of the clock signals C1, C2, C3, and C4. Further, the compiler system 500 determines that the clock signal REF1 is the fastest clock signal, the clock signal REF2 is faster than the clock signals REF3 and REF4, and the clock signal REF3 is faster than the clock signal REF3. The clock signals REF1, REF2, REF3, and REF4 are referred to as auxiliary clock signals onto which other clock signals may be mapped. The compiler system 500 may identify one or more auxiliary clock signals within a circuit design onto which other clock signals may be mapped.

In one example, the auxiliary clock signals REF2, REF3, and REF4 are determined to be divided clock signals with reference to the auxiliary clock signal REF1. Divided clocks signals start together, e.g., have an aligned rising edge, but have unaligned falling edges.

In one example, the period of the auxiliary clock signal REF1 is twice as fast as the period of the auxiliary clock signal REF2, the period of the auxiliary clock signal REF1 is four times as fast as the period of the auxiliary clock signal REF3, and the period of the auxiliary clock signal REF1 is eight times as fast as the period of the auxiliary clock signal REF4. The difference in periods between the auxiliary clock signals is $2^K$, where K is one or more.

At 630 of the method 600, the compiler system 500 remodels the clock signals based on the faster clock signal. For example, the compiler system 500 remodels one or more of the clock signals C1, C2, C3, and C4, and corresponding clock tree, based on an auxiliary clock signals REF1, REF2, REF3, or REF4 based on the faster clock signal REF1.

The clock signals C1, C2, C3, and C4, and corresponding clock tree, are remodeled based on the closest auxiliary clock signal. For example, each of the clock signals C1, C2, C3, and C4 are compared to the auxiliary clock signals REF1, REF2, REF3, and REF4 to determine which auxiliary clock signal that is closest fastest auxiliary clock signal. For example, the compiler system 500 compares the frequency of the clock signals C1, C2, C3, and C4 to the frequency of the auxiliary clock signals REF1, REF2, REF3, and REF4 to determine that the clock signal C1 is slower than the auxiliary clock signal REF1, and faster than the auxiliary clock signals REF2, REF3, and REF4. Further, the compiler system 500 determines that the clock signal C2 is slower than the auxiliary clock signal REF2 and faster than the auxiliary clock signals REF3 and REF4. The compiler system 500 further determines that the clock signal C3 is slower than the auxiliary clock signal REF3 and faster than the auxiliary clock signal REF4, and that the clock signal C4 is slower than the auxiliary clock signal REF4. Accordingly, the clock signal C1 and corresponding clock tree are remodeled based on the auxiliary clock signal REF1, the clock signal C2 and corresponding clock tree are remodeled based on the auxiliary clock signal REF2, the clock signal C3 and corresponding clock tree are remodeled based on the auxiliary clock signal REF3, and the clock signal C4 and corresponding clock tree are remodeled based on the auxiliary clock signal REF4.

While in the above, each clock signal C1, C2, C3, and C4 is remodeled based on a respective auxiliary clock signal REF1, REF2, REF3, and REF4, in other examples, two or more of the clock signals C1, C2, C3, and C4 may be remodeled based on a common auxiliary clock signal REF1, REF3, REF3, or REF4.

In one example, remodeling the clock signals C1, C2, C3 and C4 includes aligning each of the falling and rising edges of the clock signals C1, C2, C3 and C4 with the a respective nearest rising edge of a corresponding one of the auxiliary clock signals REF1, REF2, REF3, and REF4. For example, each of the falling and rising edges of the clock signal C1 are moved to be aligned with a respective nearest rising edge of the auxiliary clock signal REF1, and each of the falling and rising edges of the clock signal C2 are moved to be aligned with a respective nearest rising edge of the auxiliary clock signal REF2. Further, each of the falling and rising edges of the clock signal C3 are moved to be aligned with a respective nearest rising edge of the auxiliary clock signal REF3, and each of the falling and rising edges of the clock signal C4 are moved to be aligned with a respective nearest rising edge of the auxiliary clock signal REF4.

In one example, circuit elements within the clock tree of the clock signal C can be defined based on the expression "Always @(posedge REF1) if (cond)C<=~C. Further, modeling the clock signal Cn at positive edges of the auxiliary clock signal REFm is seen as driving the clock signal Cn by a flipflop on a rising edge of the auxiliary clock signal REFm. In the above, "n" and "m" are greater than 1, and may be equal to different from each other.

In one example, the compiler system 500 determines an index value for each auxiliary clock signal and the corresponding clock signals are to be remodeled based on the auxiliary clock signal. Each auxiliary clock signal is assigned an index value from 1 to K. The index value corresponds to the difference in periods between the fastest auxiliary clock signal (e.g., the auxiliary clock signal REF1) and each other auxiliary clock signal (e.g., the auxiliary clock signal REF2, REF3, and REF4). In an example where REF1 is the fastest clock signal, the auxiliary clock signal REF2 is REF1/2, and the auxiliary clock signal REF3 is REF2/2. Accordingly, an auxiliary clock signal REFK is $2^{(K-1)}$ slower than the clock signal REF1.

In one or more examples, each clock signal C1, C2, C3, and C4 is remodeled starting with the auxiliary clock signal having the highest index value to the auxiliary clock signal having the lowest index value.

Each clock signal C1, C2, C3, and C4 is remodeled based on a corresponding one of the auxiliary clock signals REF1, REF2, REF3, and REF4. In one example, the remodeled clock signals are modeled as flipflops driven by the corresponding auxiliary clock signal.

In one example, the index value K is 6, and the compiler system 500 remodels each of the clock signals C1, C2, C3, and C4 that is slower than the auxiliary clock signal REF4 based on the auxiliary clock signal REF4. The compiler system 500 selects the auxiliary clock signal having the next lowest index value, e.g., auxiliary clock signal REF3. The compiler system 500 remodels each of the clock signals C1, C2, and C3 that is slower than the auxiliary clock signal REF3 but faster than the auxiliary clock signal REF4 based on the auxiliary clock signal REF3. The compiler system

500 selects the auxiliary clock signal having the next lowest index value, e.g., auxiliary clock signal REF2. The compiler system 500 remodels each of the clock signals C1 and C2 that is slower than the auxiliary clock signal REF2 but faster than the auxiliary clock signal REF3 based on the auxiliary clock signal REF2. The compiler system 500 selects the auxiliary clock signal having the next lowest index value, e.g., auxiliary clock signal REF1. The compiler system 500 remodels the clock signal C1 based on the auxiliary clock signal REF1 as the clock signal C1 is slower than the auxiliary clock signal REF1 but faster than the auxiliary clock signal REF2.

In one example, the compiler system 500, starting with clock signal REFK, where K is the highest index value, identifies the circuit elements driven with a positive edge of the clock signal REFK. The compiler system 500 marks every circuit element that is driven by the clock signal REFK. In one example, if a clock tree receives the clock signal REFK, but a clear input is not reached based on positive edge of the clock signal REFK, the clock tree is determined to not be a decedent of the clock signal REFK and is predicted using another clock signal.

The compiler system 500 applies prediction as described above to each circuit element identified to be driven with the auxiliary clock signal REFK. Each circuit element that is driven by the auxiliary clock signal REFK is transformed into a data pass. Based on the prediction, clock paths within subtree of the clock tree associated with the clock signal REFK become enable data paths with a propagation time (e.g., required time) based on the period of the auxiliary clock signal REFK. A propagation time is the time in which a signal that propagates through the corresponding circuit elements is required to arrive for the circuit design to properly function.

In one or more examples, the compiler system 500 remodels a clock signal (e.g., the clock signal C1, C2, C3, and C4) based on an auxiliary clock signal (e.g., auxiliary clock signal REF1, REF2, REF3, or REF4). In one example, the compiler system 500 remodels a clock signal based on a corresponding slowest auxiliary clock signal. As is described above, the corresponding slowest auxiliary clock signal is a clock signal that has a frequency faster than the clock signal, but slower than that of another auxiliary clock signal. The clock tree associated with the remodeled clock signal is analyzed to determine if each element of the clock tree is fully originated (e.g., driven) by the auxiliary clock signal. Based on the determination that each element of the clock tree is fully originated by the auxiliary clock signal, the compiler system 500 performs prediction on the clock tree as described above. In one example, multiple clock signals may be descendants of the same auxiliary clock signal (e.g., remodeled based on the same clock signal) and analyzed together, e.g., in the same group. For example, the compiler system 500 remodels the clock signal C4 based on the auxiliary clock signal REF4 and analyzes the clock tree associated with the clock signal C4 to determine if each element of the clock tree is fully originated by the auxiliary clock signal REF4. The compiler system 500 analyzes each element of the clock tree, including the input signal of each element, to determine if each element within the clock tree is fully originated by the auxiliary clock signal REF4. Based on the determination that each element of the clock tree is fully originated by the auxiliary clock signal REF4, the compiler system 500 performs prediction on the clock tree associated with the auxiliary clock signal REF4 as described above.

In one example, the compiler system 500 determines that an input signal to a logic gate of a clock tree originates in clock domain different from that of another input signal to the logic gate. For example, the compiler system 500 determines that one of the input signals originates in clock domain associated with an auxiliary clock signal REF_j that is slower than the auxiliary clock signal REF_i (e.g., "j" is greater than "i") of the clock domain of the another input signal of the logic gate. Based on such a determination, the slow input 'w' is remodeled using "always @(posedge REF_j) w<=w_next. The input "w" may then be modeled @(posedge REF_i) and then the logic gate is predicted with respect to the clock domain REF_i. In such an example, the logic gate is predicted using the faster of the two domains.

In one example, a clock cone associated with a clock signal (e.g., clock signal C1, C2, C3, and C4) determined by analyzing each element of a clock tree of the clock signal. For example, if "w" is the output signal of a gate in the clock tree associated with the clock signal and fully originates from the clock signal (e.g., is a decedent of the clock signal REFK), forward path tracing is performed from the output of the gate. Each circuit element that is reached is determined to be part of the cone of the clock signal. Circuit elements that are not reached by performing forward path tracing are not part of the clock cone of the clock signal. For example, a circuit element that is not be a part of the clock cone of the clock signal is a logic gate that receives an input signal that originates in the clock domain of a clock signal that is slower than the clock signal that is a decedent of a rising edge of REFK.

After each element of the clock tree associated with the clock signal is analyzed, the clock tree associated with a next clock signal is analyzed as described above. This process is completed until each clock signal in a circuit design (e.g., the circuit design 502) is analyzed as described above.

In one or more examples, the flipflops in clock tree of "posedge refk" are moved directly onto "posedge refK", and "w" is redefined as a "posedge refK" flipflop and all paths internal to the clock tree of the clock cone are converted to data paths. Further, a flipflop may travelling up to another clock cone, and new data paths are ANDed to the enable pin of the flipflop, e.g. 8 cycles path, 4 cycles path, 2 cycles path.

At block 640, the compiler system 500 generates an updated circuit design based on remodeled clock signal. The updated circuit design is stored in a memory (e.g., the memory 530 and/or the storage 570). Further, the updated circuit design is used by an emulation environment (e.g., the emulation environment 800 of FIG. 8) to emulate the operation of the updated circuit design.

Figure 7:
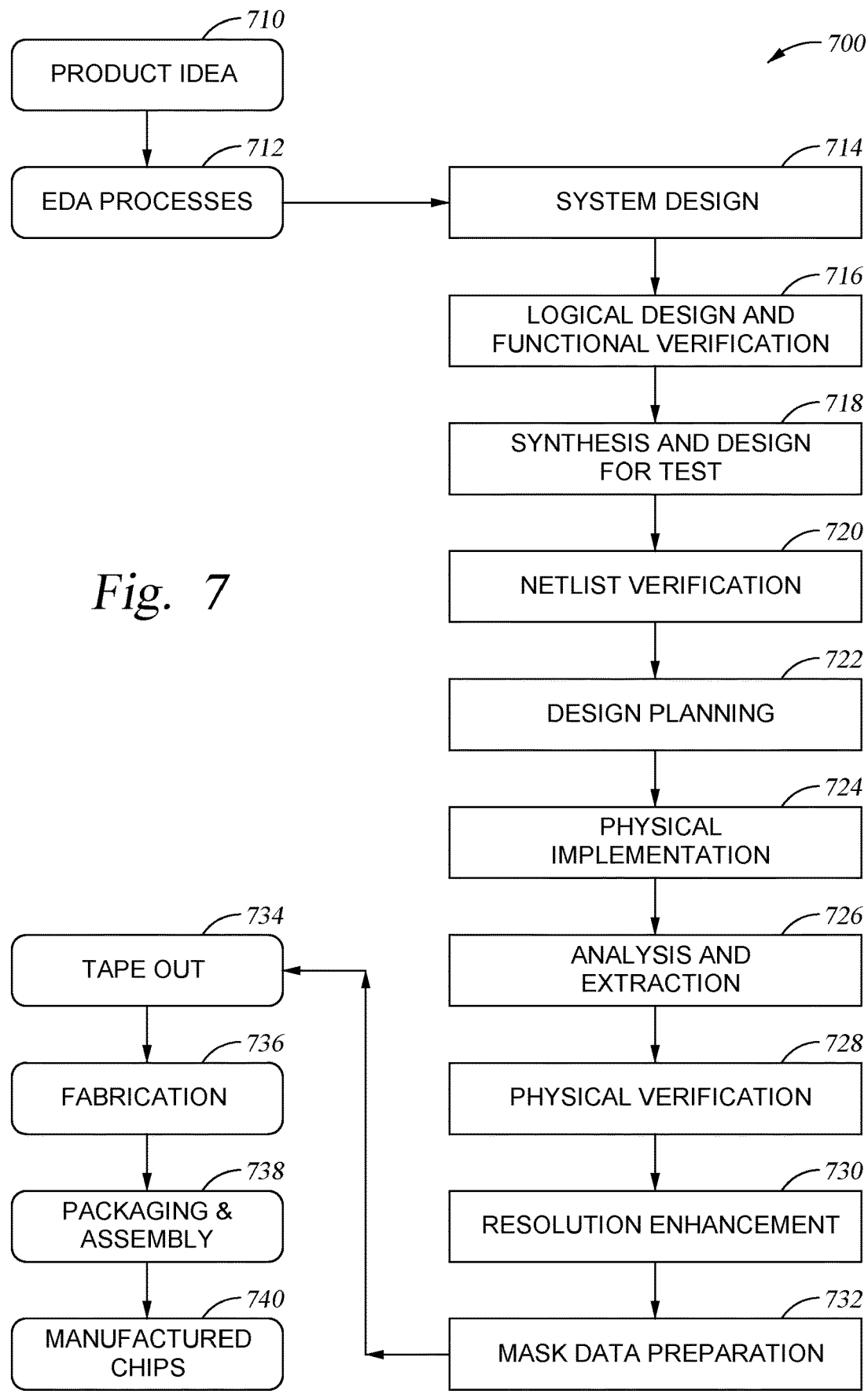
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 7. The processes described by be enabled by EDA products (or EDA systems).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 9, or host system 807 of FIG. 8) may be used to store the programs and data structures that are used by some or all of the EDA products described herein, and products used for development of cells for the library and for physical and logical design that use the library.

Figure 8:
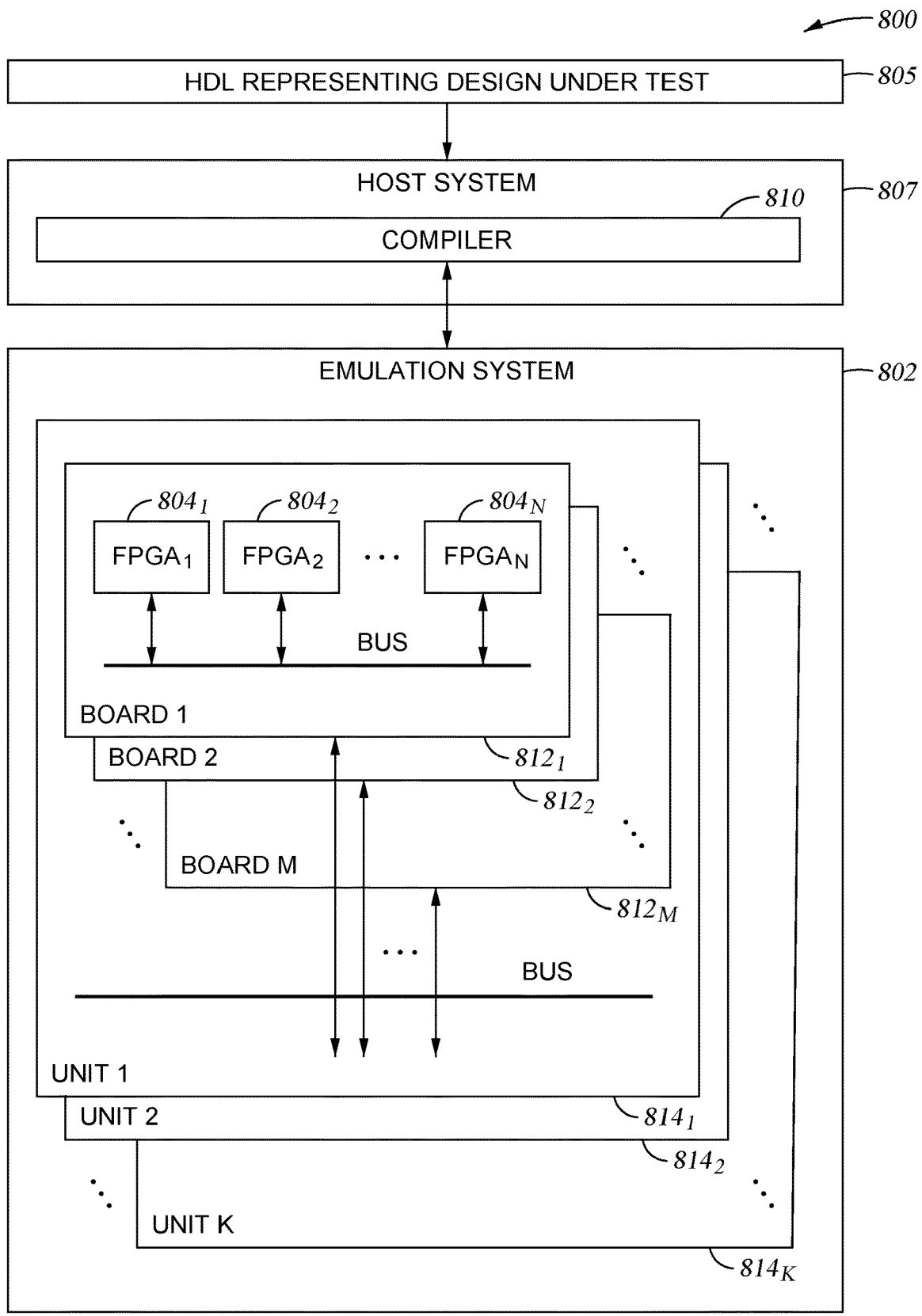
FIG. 8 depicts a diagram of an example emulation system in accordance with some embodiments of the present disclosure.

FIG. 8 depicts a diagram of an example emulation environment 800. An emulation environment 800 may be configured to verify the functionality of the circuit design. The emulation environment 800 may include a host system 807 (e.g., a computer that is part of an EDA system) and an emulation system 802 (e.g., a set of programmable devices such as Field Programmable Gate Arrays (FPGAs) or processors). The host system generates data and information by using a compiler 810 to structure the emulation system to emulate a circuit design. A circuit design to be emulated is also referred to as a Design Under Test ('DUT') where data and information from the emulation are used to verify the functionality of the DUT.

The host system 807 may include one or more processors. In the embodiment where the host system includes multiple processors, the functions described herein as being performed by the host system can be distributed among the multiple processors. The host system 807 may include a compiler 810 to transform specifications written in a description language that represents a DUT and to produce data (e.g., binary data) and information that is used to structure the emulation system 802 to emulate the DUT. The compiler 810 can transform, change, restructure, add new functions to, and/or control the timing of the DUT.

The host system 807 and emulation system 802 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 807 and emulation system 802 can exchange data and information through a third device such as a network server.

The emulation system 802 includes multiple FPGAs (or other modules) such as FPGAs 804$_1$ and 804$_2$ as well as additional FPGAs to 804$_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 802 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs 804$_1$-804$_N$ may be placed onto one or more boards 812$_1$ and 812$_2$ as well as additional boards through 812$_M$. Multiple boards can be placed into an emulation unit 814$_1$. The boards within an emulation unit can be connected using the backplane of the emulation unit or any other types of connections. In addition, multiple emulation units (e.g., 814$_1$ and 814$_2$ through 814$_K$) can be connected to each other by cables or any other means to form a multi-emulation unit system.

For a DUT that is to be emulated, the host system 807 transmits one or more bit files to the emulation system 802. The bit files may specify a description of the DUT and may further specify partitions of the DUT created by the host system 807 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 807 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 807 and/or the compiler 810 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 805 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   obtaining a circuit design, the circuit design comprising clock signals, wherein each of the clock signals is based on a root clock signal;
   determining, by a processor, a first clock signal of the clock signals that is faster than a second clock signal of the clock signals;
   remodeling the second clock signal based on the first clock signal;
   generating an updated circuit design based on the remodeled second clock signal; and
   emulating an operation of the updated circuit design.

2. The method of claim 1 further comprising:
   determining that the first clock signal of the clock signals is faster than a third clock signal of the clock signals; and
   remodeling the third clock signal based on the first clock signal.

3. The method of claim 1 further comprising:
   determining that a third clock signal of the clock signals is faster than a fourth clock signal of the clock signals; and
   remodeling the fourth clock signal based on the third clock signal.

4. The method of claim 3, wherein the first clock signal is faster than the third clock signal, and the second clock signal is faster than the third clock signal.

5. The method of claim 1 further comprising aligning a rising edge of the second clock signal with a rising edge of the first clock signal and aligning a falling edge of the second clock signal with a rising edge of the first clock signal.

6. The method of claim 1, wherein remodeling the second clock signal based on the first clock signal comprises adjusting a clock cone of the second clock signal to be driven based on the first clock signal instead of the first clock signal.

7. The method of claim 6 further comprising:
   determining that a first input signal of a first circuit element of the clock cone of the second clock signal corresponds to a first clock domain and a second input signal of the first circuit element corresponds to a second clock domain different than the first clock domain; and
   predicting an output value of the first circuit element based on the second clock domain.

8. A system comprising:
   a memory storing instructions; and
   a processor, coupled with the memory and configured to execute the instructions, the instructions when executed cause the processor to:
      obtain a circuit design, the circuit design comprising clock signals, wherein each of the clock signals is based on a root clock signal;
      determine a first clock signal of the clock signals that is faster than a second clock signal of the clock signals;
      align each rising edge and each falling edge of the second clock signal with a respective rising edge of the first clock signal, generating a remodeled second clock signal; and
      emulate the circuit design using the remodeled second clock signal.

9. The system of claim 8, wherein the processor is further caused to:
   determine that the first clock signal of the clock signals is faster than a third clock signal of the clock signals; and
   remodel the third clock signal based on the first clock signal.

10. The system of claim 9, wherein the processor is further caused to:
    align each rising edge and each falling edge of the third clock signal with a respective rising edge of the first clock signal.

11. The system of claim 8, wherein the processor is further caused to:
    determine that a third clock signal of the clock signals is faster than a fourth clock signal of the clock signals; and
    remodel the fourth clock signal based on the third clock signal.

12. The system of claim 11, wherein the first clock signal is faster than the third clock signal, and the second clock signal is faster than the third clock signal.

13. The system of claim 8, wherein remodeling the second clock signal based on the first clock signal comprising adjusting a clock cone of the second clock signal to be driven based on the first clock signal instead of the first clock signal.

14. The system of claim 13, wherein the processor is further caused to:
    determine that a first input signal of a first circuit element of the clock cone of the second clock signal corresponds to a first clock domain and a second input signal of the first circuit element corresponds to a second clock domain different than the first clock domain; and predict an output value of the first circuit element based on the second clock domain.

15. A non-transitory computer readable medium comprising stored instructions, which when executed by a processor, cause the processor to:

obtain a circuit design, the circuit design comprising clock signals, wherein each of the clock signals is based on a root clock signal;

determine a first clock signal of the clock signals that is faster than a second clock signal of the clock signals;

remodel the second clock signal based on the first clock signal; and generate an updated circuit design based on remodeled second clock signal, wherein operation of the updated circuit design is emulated.

16. The non-transitory computer readable medium of claim 15, wherein the processor is further caused to:

determining that the first clock signal of the clock signals is faster than a third clock signal of the clock signals; and remodeling the third clock signal based on the first clock signal.

17. The non-transitory computer readable medium of claim 15, wherein the processor is further caused to:

determining that a third clock signal of the clock signals is faster than a fourth clock signal of the clock signals; and remodeling the fourth clock signal based on the third clock signal.

18. The non-transitory computer readable medium of claim 15, wherein the processor is further caused to:

align a rising edge of the second clock signal with a rising edge of the first clock signal and aligning a falling edge of the second clock signal with a rising edge of the first clock signal.

19. The non-transitory computer readable medium of claim 15, wherein remodeling the second clock signal based on the first clock signal comprising adjusting a clock cone of the second clock signal to be driven based on the first clock signal instead of the first clock signal.

20. The non-transitory computer readable medium of claim 19, wherein the processor is further caused to:

determine that a first input signal of a first circuit element of the clock cone of the second clock signal corresponds to a first clock domain and a second input signal of the first circuit element corresponds to a second clock domain different than the first clock domain; and predict an output value of the first circuit element based on the second clock domain.

* * * * *